United States Patent [19]
Mole et al.

[11] 4,037,123
[45] July 19, 1977

[54] DYNAMOELECTRIC MACHINE WITH A SUPERCONDUCTIVE FIELD WINDING THAT CAN OPERATE IN EITHER A SYNCHRONOUS OR AN ASYNCHRONOUS MODE

[75] Inventors: Cecil J. Mole, Monroeville; Henry E. Haller, III, Pittsburgh, both of Pa.

[73] Assignee: Westinghouse Electric Corporation, Pittsburgh, Pa.

[21] Appl. No.: 596,776

[22] Filed: July 17, 1975

Related U.S. Application Data

[63] Continuation of Ser. No. 327,520, Jan. 29, 1973, Pat. No. T925,001.

[51] Int. Cl.² .............................................. H02K 9/00
[52] U.S. Cl. ..................................................... 310/52
[58] Field of Search ....................... 310/10, 40, 64, 52, 310/165, 61, 211, 198, 201, 194, 112, 114; 336/55-62

[56] References Cited

U.S. PATENT DOCUMENTS

| | | | |
|---|---|---|---|
| 3,644,766 | 2/1972 | Hughes | 310/165 |
| 3,648,082 | 3/1972 | MacNab | 310/10 |
| 3,679,920 | 7/1972 | MacNab | 310/10 |
| 3,742,265 | 6/1973 | Smith | 310/52 |
| 3,764,835 | 10/1973 | Luck | 310/52 |

*Primary Examiner*—R. Skudy
*Attorney, Agent, or Firm*—G. H. Telfer

[57] ABSTRACT

Two parallel magnetic flux paths are provided in a dynamoelectric machine having a superconductive field winding. A first, or main, magnetic flux path includes at least one area of nonferromagnetic or diamagnetic material. A second, or shunt, magnetic flux path prevents the relatively low frequency AC flux present during starting or asynchronous operation of the machine, when used as an AC motor, from penetrating the superconductive winding.

12 Claims, 3 Drawing Figures

U.S. Patent
July 19, 1977
4,037,123
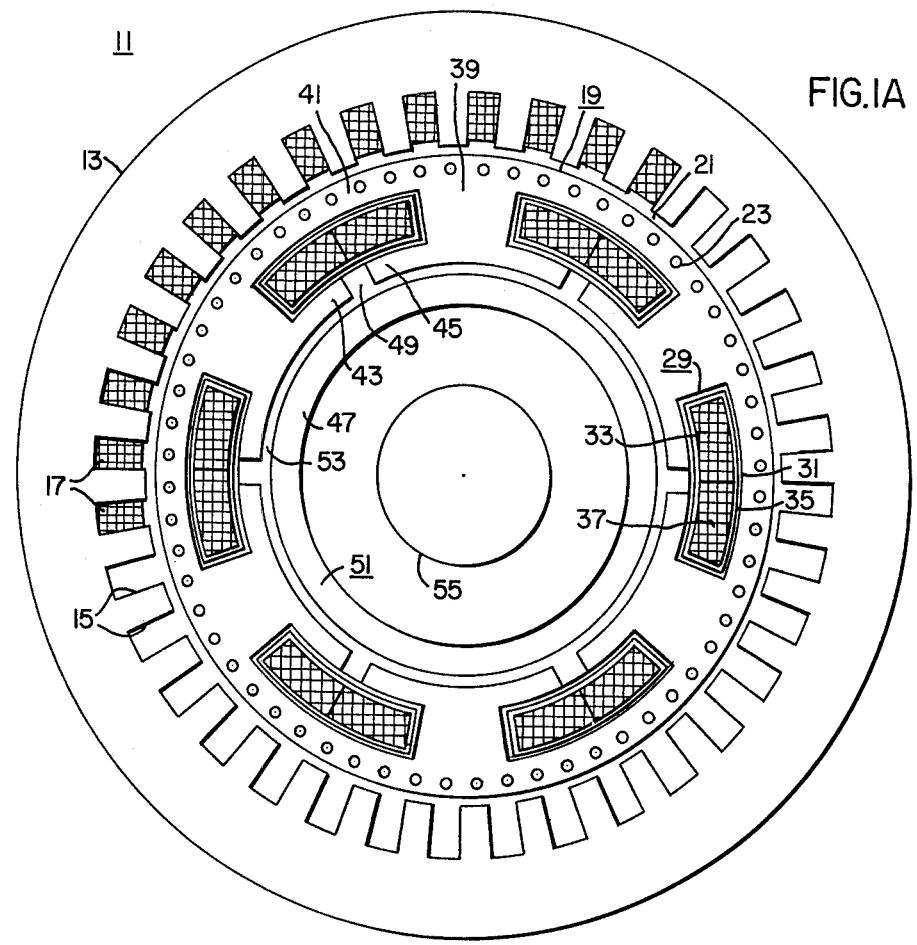
FIG.1A
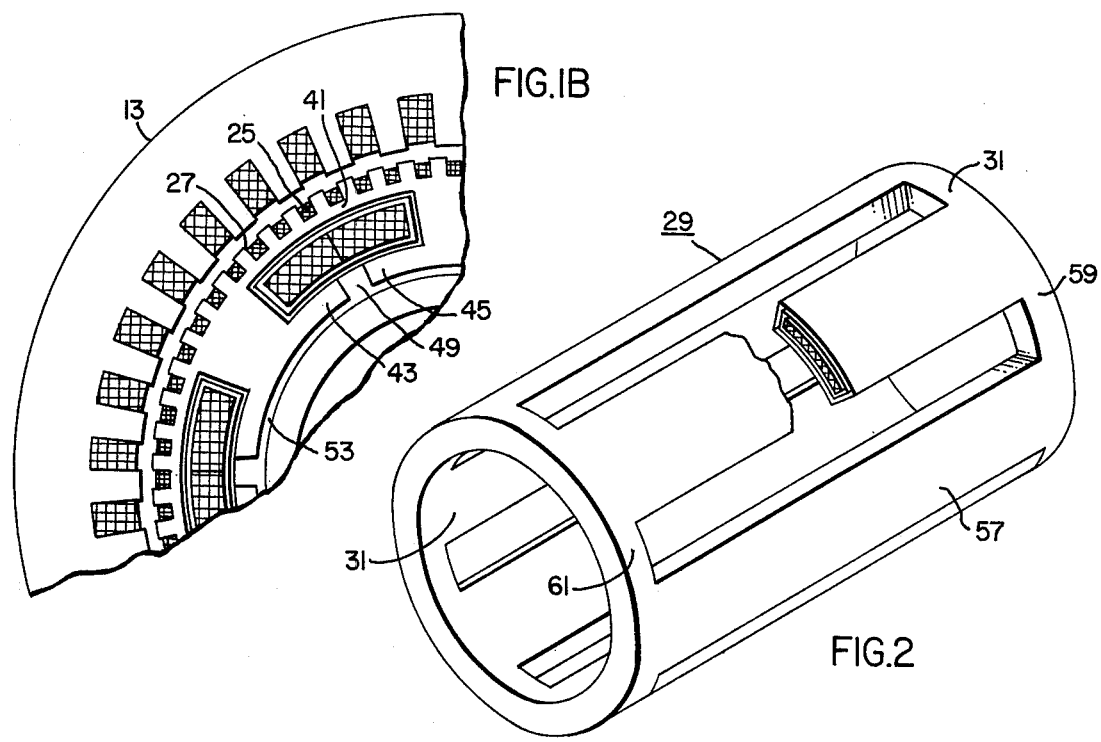
FIG.1B
FIG.2

DYNAMOELECTRIC MACHINE WITH A SUPERCONDUCTIVE FIELD WINDING THAT CAN OPERATE IN EITHER A SYNCHRONOUS OR AN ASYNCHRONOUS MODE

This is a continuation of application Ser. No. 327,520 filed Jan. 29, 1973, now Defensive Publication T925,001.

BACKGROUND OF THE INVENTION

1. Field of the Invention

This invention relates primarily to dynamoelectric machinery utilizing a superconductive field winding, and more specifically, this invention relates to a dynamoelectric machine utilizing a superconductive field winding that can operate effectively as an alternating current (AC) motor in both the synchronous and asynchronous modes.

2. Description of the Prior Art

Within the last ten or twelve years, considerable interest has arisen in utilizing the extremely low electrical resistance state that certain materials exhibit at cryogenic temperatures, known as superconductivity, in the construction of dynamoelectric machinery. As a result of the extremely high magnetic fields that can be produced by utilization of the superconductive effect, prior art efforts in the superconductive machinery field have been directed toward the utilization of an essentially all air gap structure in which ferromagnetic material is not utilized. Such efforts have produced dynamoelectric machines that operate reasonably well as synchronous AC motors. However, these machines do not operate effectively during the asynchronous mode of operation encountered during starting or in the presence of transient conditions.

One of the difficulties encountered when an all air gap construction is utilized for an AC motor is that the torque produced during asynchronous operation is relatively small. This results from the fact that during starting the machine operates as an induction motor with a conventional strength (or even smaller) AC magnetic field. Since the conventional strength field has a magnetic flux density that is only a small fraction of that produced by a superconductive winding, the lack of a ferromagnetic path results in very inefficient utilization of the relatively small amount of flux available. Accordingly, the torque produced during this phase is relatively quite small.

Another problem that arises during asynchronous operation of a superconductive AC motor is that relatively low frequency AC magnetic fields, such as those produced at slightly subsynchronous speeds, penetrate into the superconductive winding. Since superconductivity is essentially a DC phenomenon, the introduction of AC fields results in relatively high energy losses that are unacceptable. Not only are the losses undesirable; they may result in "quenching" or loss of the superconductive effort. Thus, prior art devices have had to include a separate flux shield, such as that disclosed in U.S. Pat. No. 3,679,920, MacNab et al, issued July 25, 1972.

SUMMARY OF THE INVENTION

A machine that overcomes these difficulties is disclosed in the copending application of C. J. Mole and R. F. Edwards, entitled "Dynamoelectric Machinery Utilizing Superconductive Windings", filed on Jan. 29, 1973, Ser. No.. 327,540, which application is now abandoned and succeeded by continuation application Ser. No. 596,775, filed July 17, 1975, and assigned to the same assignee as this application. The arrangement disclosed in the copending application provides a machine utilizing superconductive field windings that operates well as an AC motor in both the synchronous and asynchronous modes. There are, however, some deficiencies with respect to undesired flux loss during synchronous operation and with respect to the cooling arrangement.

The dynamoelectric machine structure disclosed herein is an improvement of the machine illustrated in the copending Mole et al application identified above and obviates the deficiencies thereof without loss of the significant advances over the prior art found in that arrangement. The present invention includes an armature having an appropriate armature winding thereon. In the particular embodiments illustrated herein, the armature is a stationary annulus having a generally cylindrical shape with the armature winding located in slots along the inner circumference thereof.

A field structure is mounted inside the armature annulus and is arranged for motion relative to the armature. Conductors of the field structure are located adjacent the armature winding that is separated therefrom by an air gap. The conductors are arranged to respond to AC magnetic flux produced by the armature winding during the starting operation, when the machine is utilized as an AC motor. Thus, during starting the machine operates essentially as an induction motor, and the conductors may be either the bars for a squirrel cage winding or the bars of a wound rotor winding.

In the particular embodiments disclosed herein, the conductors are located along the outer circumference of a first core of ferromagnetic material. First portions of ferromagnetic material in the first core are arranged to provide a plurality of magnetic poles. A superconductive winding is wound about the first portions to provide magnetic flux for the magnetic poles. The superconductive winding may be either single or multiple strand and has separate segments thereof wound about the appropriate first portions of ferromagnetic material. The superconductive winding is isolated both from the magnetic core and ambient conditions by an insulating arrangement, such as a dewar vessel.

The superconductive winding is spaced from the conductors so that second portions of ferromagnetic material in the first core separate the superconductive winding from the conductors. These second portions are an integral part of the first core and provide a magnetic flux path between adjacent pairs of poles. During starting operation of the machine, when operated as an AC motor, these second portions provide a shunt path for the relatively low frequency AC magnetic flux and, hence, this flux is prevented from penetrating into the superconductive winding. During synchronous operation, however, these second portions of ferromagnetic material are saturated and the flux shunted therethrough is a relatively small percentage of the total flux generated by the superconductive winding.

Third portions of ferromagnetic material include segments of the first core that extend toward each other from adjacent poles. An area of nonferromagnetic material, such as an air gap, is located between the ends of the segments which are spaced apart from each other. During asynchronous operation of the machine, the air gap between the segments precludes magnetic flux flow and, hence, the magnetic flux follows the path formed by the second portions of ferromagnetic material. When the second portions become saturated during synchronous operation, the main flux has a return path through the extending segments.

The main flux path may also include sections of ferromagnetic material (which are included in the third portions) that are separated from the segments in the poles by an area of nonferromagnetic material, such as an air gap. These sections may be provided by a second generally cylindrical annulus of ferromagnetic material constituting a second core. In some applications, these sections could provide the only return path for the main flux, if the segments were either eliminated or the air gap therebetween made sufficiently large.

In one particular embodiment, the dewar vessel could take the shape of a series of axial spokes. A header ring placed at each end of the structure formed by the spokes would interconnect the corresponding ends of the spokes. This structure could then be assembled into the first core in an appropriate fashion, which would involve an appropriate arrangement to minimize heat loss.

With the arrangement described herein, the dewar vessel encloses only the superconductive winding and, hence, the refrigerating requirements of the device are reduced. In addition, the loss of magnetic flux occasioned by the main field flux having to pass through the insulating structure of the dewar vessel is considerably reduced and a significant increase in the flux available for synchronous operation is achieved.

The foregoing and other objects, advantages and features of this invention will hereinafter appear, and for purposes of illustration, but not of limitation, exemplary embodiments of the subject invention are shown in the appended drawing.

BRIEF DESCRIPTION OF THE DRAWING

FIG. 1A is a schematic cross-sectional view taken along a plane transverse to the axis of a dynamoelectric machine incorporating one embodiment of the subject invention.

FIG. 1B is a fragmentary schematic view of a portion of a dynamoelectric machine incorporating a second embodiment of the subject invention.

FIG. 2 is a schematic illustration of an insulating structure utilized in the dynamoelectric machines depicted in FIGS. 1A and 1B.

DESCRIPTION OF THE PREFERRED EMBODIMENTS

In FIG. 1A there is illustrated, in schematic form, one of the preferred embodiments of the present invention. A dynamoelectric machine 11 is shown in radial cross-section (i.e., in a plane transverse to the axis of machine 11). Although the present invention has applicability to many different types of structures, the preferred embodiment disclosed herein is in the form of a cylindrical machine. Also, although this invention is applicable to other uses of the machine, such as a generator or synchronous condenser, this description will treat dynamoelectric machine 11 as an AC motor that operates in both the synchronous and asynchronous modes.

An armature or stator 13 is formed of a ferromagnetic material, such as iron, in the shape of a generally cylindrical annulus. Slots 15 are formed in the inner circumference of annular stator 13 and armature windings 17 are positioned in the slots 15.

Positioned inside of stator 13 and concentric therewith is a generally cylindrical annulus of ferromagnetic material that forms a first rotor core 19. Core 19 is spaced from stator 13 to form an air gap 21 therebetween.

Conductors 23 or 25 (FIGS. 1A and 1B) may be located in core 19 around the outer circumference thereof. These conductors form the induction motor winding utilized during he asynchronous mode of operation while starting the machine. The two embodiments illustrated utilize two different types of conductors 23 and 25. Conductors 23 are the bars of a squirrel cage winding, while the conductors 25 are bars located in slots 27 of a wound rotor construction. The advantage of a squirrel cage winding is that less expense is involved, while the advantage of the wound rotor construction is that the induction winding can be utilized as an auxiliary field winding in case the superconductive field is lost. The particular type of induction winding that will be utilized will depend upon the requirements of a given situation.

Located approximately midway along the radial length of the core 19 are a plurality of dewar vessels 29. Dewar vessels 29 have an outer wall 31, an inner wall 33, and a radiation shield 35. A vacuum is formed between walls 31 and 33 to provide a thermal barrier, while radiation shield 35 assists in thermally isolating the interior of dewar vessels 29 from ambient temperature conditions. The interiors of dewar vessels 29 are also, of course, thermally isolated from core 19.

Inside dewar vessel 29 there is located a superconductive winding or windings 37 (in the preferred embodiment depicted a pair of windings 37 are enclosed in each dewar vessel 29). Superconductive winding 37 is any appropriate winding of this natue, whether single or multiple strand and whether a continuous winding or separate segments. Any appropriate superconductive material, for example niobium-titanium, may be utilized.

The superconductive winding is wound about a plurality of first portions of ferromagnetic material 39. Portions 39 are magnetic poles for which superconductive winding 37 provides a magnetic flux. Portions 39 are illustrated as an integral part of core 19, but of course they could be separately mounted portions of ferromagnetic material.

Second portions of ferromagnetic material 41 link adjacent pairs of poles 39 and provide a first magnetic flux path between. Portions 41 are located between superconductive winding 37 and induction motor winding 23 or 25. The portions 41 are shown as an integral part of core 19, but of course these sections could be separate from both the superconductive winding 37 and the induction winding 23 or 25, so long as a magnetic flux path exists between the poles. This first magnetic flux path serves as a shunt path for the relatively low frequency AC magnetic fields produced during asynchronous operation of the motor. In this way, the AC fields are prevented from penetrating into the superconductive winding and causing undesired losses therein. In addition to the power losses, these AC fields may cause "quenching" or loss of the superconductive effect.

A second magnetic flux path between pairs of adjacent poles 39 is provided by third portions of ferromagnetic material 43, 45 and 47. Segments 43 and 45 are an integral part of core 19 and extend toward each other from adjacent poles. The ends of segments 43 and 45 are spaced from each other so that an air gap 49 is formed therebetween. Air gap 49 provides an area of nonferromagnetic material in the second flux path provided by segments 43 and 45. Sections 47 extend between adjacent pairs of poles and are formed into a composite that has the shape of a generally cylindrical annulus concentric with stator 13 and first core 19. This annulus provides a second core of ferromagnetic material 51. Sections 47 of core 51 are spaced from poles 39 and segments 43 and 45 to form an air gap 53 therebetween. Air gap 53 provides an area of nonferromagnetic material in the second magnetic flux path that includes sections 47. It should be noted that sections 47 need not be of ferromagnetic material, in which case the second magnetic flux path would be confined to the path through segments 43 and 45 and the air gap 49. Also, dewar vessel 29 could be placed at the innermost circumference of core 19 to eliminate segments 43 and 45, in which case the second magnetic flux path would include only the sections 47 and air gap 53.

Core 51 is fixed to core 19 for rotation therewith. Any appropriate means for fixedly connecting cores 19 and 51 may be utilized, such as a spider of nonferromagnetic material or appropriate end pieces. Of course, these cores could also be integrally formed with the inner connection therebetween being located out of the active magnetic portion of the machine to preclude stray flux paths.

Power is extracted from the machine by means of a shaft 55. Shaft 55 is solidly connected to cores 19 and 51 by any appropriate means, and is mounted in the housing (not shown) by appropriate bearings (not shown).

In operating machine 11 as an AC motor, an appropriate AC current is applied to armature winding 17 during the starting phase. The magnetic flux produced by the armature winding interacts with the induction motor conductors 23 or 25 to provide a starting torque. The AC flux generated by the armature winding, especially the relatively low frequency flux produced as the rotor approaches synchronous speed, is prevented from penetrating into the superconductive winding by the shunt path provided by portions 41. Essentially all of the magnetic flux present during the asynchronous operation is confined to this path, as a result of the air gaps 49 and 53 that prevent the AC flux from utilizing the second or main magnetic flux path through segments 43 and 45 and sections 47.

During steady state or synchronous operation, the portions 41 of ferromagnetic material become saturated by the high flux levels resulting from use of the superconductive winding. Due to the extremely high magnetic fields produced by the superconductive winding, only about twenty percent of the generated flux would be shunted through portions 41 before they reach saturation. Thus, approximately eighty percent of the generated flux flows in the second magnetic flux path through segments 43 and 45 and sections 47. The flux flowing in this second or main magnetic flux path is thus available for use during synchronous operation.

As a result of the above-described structure, a motor is provided that exhibits relatively high asynchronous torque for starting and yet retains a large percentage of the high fields produced by the superconductive winding for synchronous operation. Also, by use of this structure, the dewar vessels need only maintain superconductive windings at cryogenic temperatures; all of the other components operate at ambient temperatures. This, of course, reduces the amount of refrigeration that is required and, hence, increases the overall efficiency of the machine. In addition, removal of the dewar vessel wall structure from the active path for synchronous operation of the machine considerably increases the amount of flux available for such synchronous operation. Therefore, another increase in the efficiency of the machine is achieved.

In FIG. 2 a specific form that the dewar vessel 29 might take is illustrated. In this embodiment, the dewar vessel is formed with axial spokes 57, and header rings 59 and 61 are located at each end of the axial spoke structure and are connected with the appropriate ends of each of the spokes. Superconductive winding 37 is located in the vessel and appropriate connections are made to introduce the cyrogenic fluid to the interior of the vessel with a minimal heat loss. Appropriate mounting arrangements are provided so that dewar vessel 29 may be mounted on core 19 with a minimal heat leakage from the vessel.

It should be understood that various modifications, changes and variations may be made in the arrangements, operations and details of construction of the elements disclosed herein without departing from the spirit and scope of the present invention.

We claim:

1. In a dynamoelectric machine having an armature and a field structure mounted for relative motion therebetween, an improved field structure comprising:
   conductors spaced from the armature;
   a plurality of first portions of ferromagnetic material;
   a superconductive winding wound about said first portions of ferromagnetic material to form a plurality of magnetic poles;
   insulating means thermally isolating said superconductive winding from said poles and from ambient conditions;
   second portions of ferromagnetic material positioned between said superconductive winding and said conductors and interconnecting adjacent pairs of said poles to provide a first magnetic flux path therebetween;
   third portions of ferromagnetic material forming a second magnetic flux path between adjacent pairs of said poles on the side of said superconductive winding away from said conductors; and
   an area of nonferromagnetic material located in said second magnetic flux path.

2. A field structure as claimed in claim 1 wherein:
   said third portions of ferromagnetic material comprises segments extending toward each other from adjacent poles; and
   said area of nonferromagnetic material comprises an air gap between the ends of said segments.

3. A field structure as claimed in claim 2 wherein:
   said third portions of ferromagnetic material further comprises sections extending between adjacent pairs of poles on the same side of and at a greater distance from said superconductive winding than said segments; and
   said area of nonferromagnetic material further comprises an air gap that separates said sections from said segments and said poles.

4. A field structure as claimed in claim 3 wherein the air gap between said segments is larger than the air gap separating said sections from said poles and said segments.

5. A field structure as claimed in claim 1 wherein:
   said third portions of ferromagnetic material comprises sections extending between adjacent pairs of poles on the side of said superconductive winding away from said conductors; and said area of nonferromagnetic material comprises an air gap that separates said sections from said poles and said superconductive winding.

6. A field structure as claimed in claim 1 wherein said conductors form a wound rotor induction motor winding.

7. A field structure as claimed in claim 1 wherein said conductors form a squirrel cage inductor motor winding.

8. In a dynamoelectric machine having a stator, an improved rotor comprising:
- a first core of ferromagnetic material spaced from the stator to form an air gap therebetween and mounted for movement relative to the stator;
- conductors located in said first core adjacent the air gap between said first core and the stator;
- first portions of said first core arranged to form a plurality of magnetic poles;
- a superconductive winding located about said first portions of said first core;
- insulating means thermally isolating said superconductive winding from said first core and from ambient conditions;
- second portions of said first core separating said conductors from said superconductive winding and interconnecting said poles to provide a first magnetic flux path therebetween;
- segments of said first core extending toward each other from adjacent poles on the side of said superconductive winding away from said conductors, the ends of said segments being spaced apart to form an air gap therebetween; and
- a second core of ferromagnetic material positioned adjacent to said poles and said segments and spaced therefrom to form an air gap therebetween, said second core comprising sections extending between adjacent pairs of said poles.

9. In a dynamoelectric machine having a stator in the form of a generally cylindrical annulus with an armature winding wound about the inner circumference thereof an improved rotor comprising:
- a first core of ferromagnetic material in the form of a generally cylindrical annulus located inside the stator and concentric therewith, said first core being spaced from the stator to form an air gap therebetween;
- conductors located in said first core about the outer circumference thereof;
- first portions of said first core arranged to provide magnetic poles adjacent the armature winding at spaced intervals therealong;
- a superconductive winding wound about said first portions of said first core to provide magnetic flux therefor, said superconductive winding being spaced from both the inner circumference and the outer circumference of said first core;
- insulating means thermally isolating said superconductive winding from said first core and from ambient conditions;
- second portions of said first core separating said superconductive winding from said conductors and interconnecting adjacent poles to provide first magnetic flux paths therebetween;
- segments of said first core projecting toward each other from adjacent poles and located between said superconductive winding and the inner circumference of said first core, the ends of said segments being spaced from each other to form an air gap therebetween;
- a second core of ferromagnetic material in the form of a cylindrical annulus located inside of and concentric with said first core and spaced thererom to form an air gap therebetween, said first and second cores being mounted for conjoint rotation, and said second core comprising sections extending between adjacent pairs of said poles whereby said sections and said segments provide a second magnetic flux path between said poles.

10. A rotor as claimed in claim 9 wherein said conductors form a wound rotor induction motor winding.

11. A rotor as claimed in claim 9 wherein said conductors form a squirrel cage induction motor winding.

12. A rotor as claimed in claim 9 wherein said insulating means is a dewar vessel comprising:
- a series of axial spokes; and
- a header ring at each end of said dewar vessel, each of said header rings joined to the corresponding ends of all of said spokes.

* * * * *